United States Patent [19]

Lanzetta et al.

[11] Patent Number: 5,581,576
[45] Date of Patent: Dec. 3, 1996

[54] RADIO INFORMATION BROADCASTING AND RECEIVING SYSTEM

[75] Inventors: Alphonso P. Lanzetta, Marlboro; Lawrence S. Mok, Brewster, both of N.Y.

[73] Assignee: International Business Machines Corp., Armonk, N.Y.

[21] Appl. No.: 371,621

[22] Filed: Jan. 12, 1995

[51] Int. Cl.$^6$ .............................. H04L 27/00; H04L 27/28
[52] U.S. Cl. .............................. 375/216; 375/260; 455/45; 381/2
[58] Field of Search ............................. 455/6.3, 45, 133, 455/186.1; 381/2, 77, 14; 375/259, 260, 216, 271, 272, 268, 300, 303, 320, 334, 267, 299, 347, 316, 295; 332/117, 151, 149, 144, 100; 329/315, 300, 345, 347, 348; 370/110.4, 110.1; 371/30

[56] References Cited

U.S. PATENT DOCUMENTS

| | | | |
|---|---|---|---|
| 3,917,906 | 11/1975 | Johnson et al. | 455/45 |
| 3,922,607 | 11/1975 | Wysong | 455/45 |
| 3,967,202 | 6/1976 | Batz | 325/31 |
| 3,986,122 | 10/1976 | McManus | 325/42 |
| 4,280,020 | 7/1981 | Schnurr | 375/216 |
| 4,379,947 | 4/1983 | Warner | 455/45 |
| 4,449,145 | 5/1984 | Circiora | 348/466 |
| 4,449,249 | 5/1984 | Price | 455/45 |
| 4,512,025 | 4/1985 | Frankel et al. | 375/36 |
| 4,928,177 | 5/1990 | Martinez | 358/142 |
| 5,038,402 | 8/1991 | Robbins | 381/2 |
| 5,119,503 | 6/1992 | Mankovitz | 455/45 |
| 5,146,612 | 9/1992 | Grosjean et al. | 455/45 |
| 5,161,251 | 11/1992 | Mankovitz | 381/2 |
| 5,278,826 | 1/1990 | Murphy et al. | 375/281 |
| 5,408,686 | 4/1995 | Mankovitz | 455/6.3 |

*Primary Examiner*—Tesfaldet Bocure
*Attorney, Agent, or Firm*—Perman & Green

[57] ABSTRACT

A radio information broadcasting and receiving system consisting of three major parts: an FM transmitter station with subcarrier multiplexing capability, an FM receiver apparatus with subcarrier demodulation capability, and a computer connected in combination with the receiver apparatus. The FM transmitter station includes sources of main programming signals first digital data signals and second digital data signals. The first and second digital data signals are modulated by subcarrier 1 and subcarrier 2 frequencies respectively and are mixed with the main program signal and then transmitted. The transmitted signals are received by a receiver apparatus including an FM receiver circuit and an FM demodulator circuit for receiving the broadcast signal and demodulating it. The demodulated main program audio frequency signal is applied through a filter/deemphasis circuit and amplifier to speaker to provide an audio output. The first subcarrier frequency signal is demodulated by a first subcarrier frequency generator to provide a digital signal of the text portion of the transmitted signal which is then applied to a first input port of this digital computer. Likewise, the second subcarrier frequency is demodulated and the resultant index digital data signal is applied to a second input port of the computer.

7 Claims, 2 Drawing Sheets

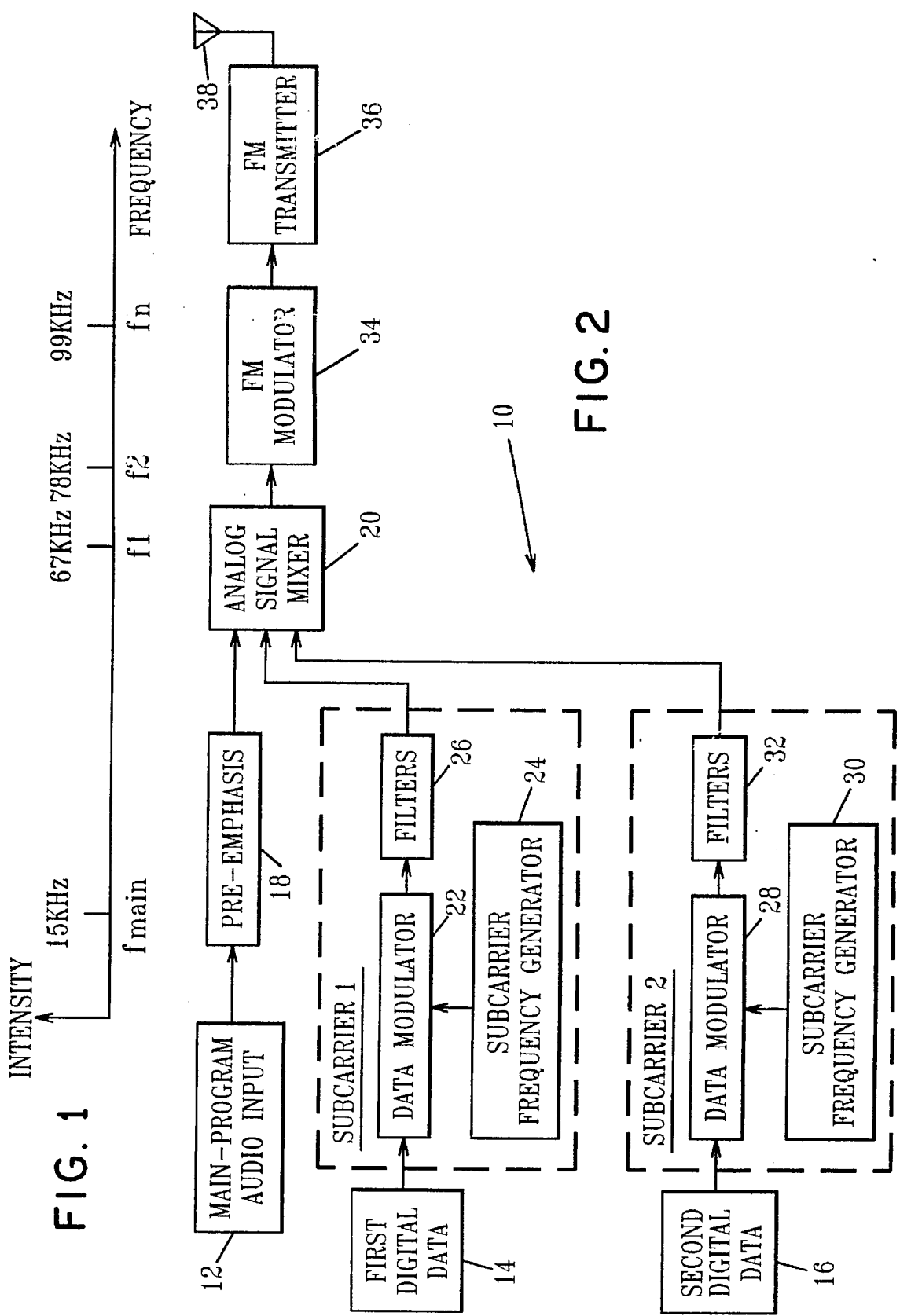

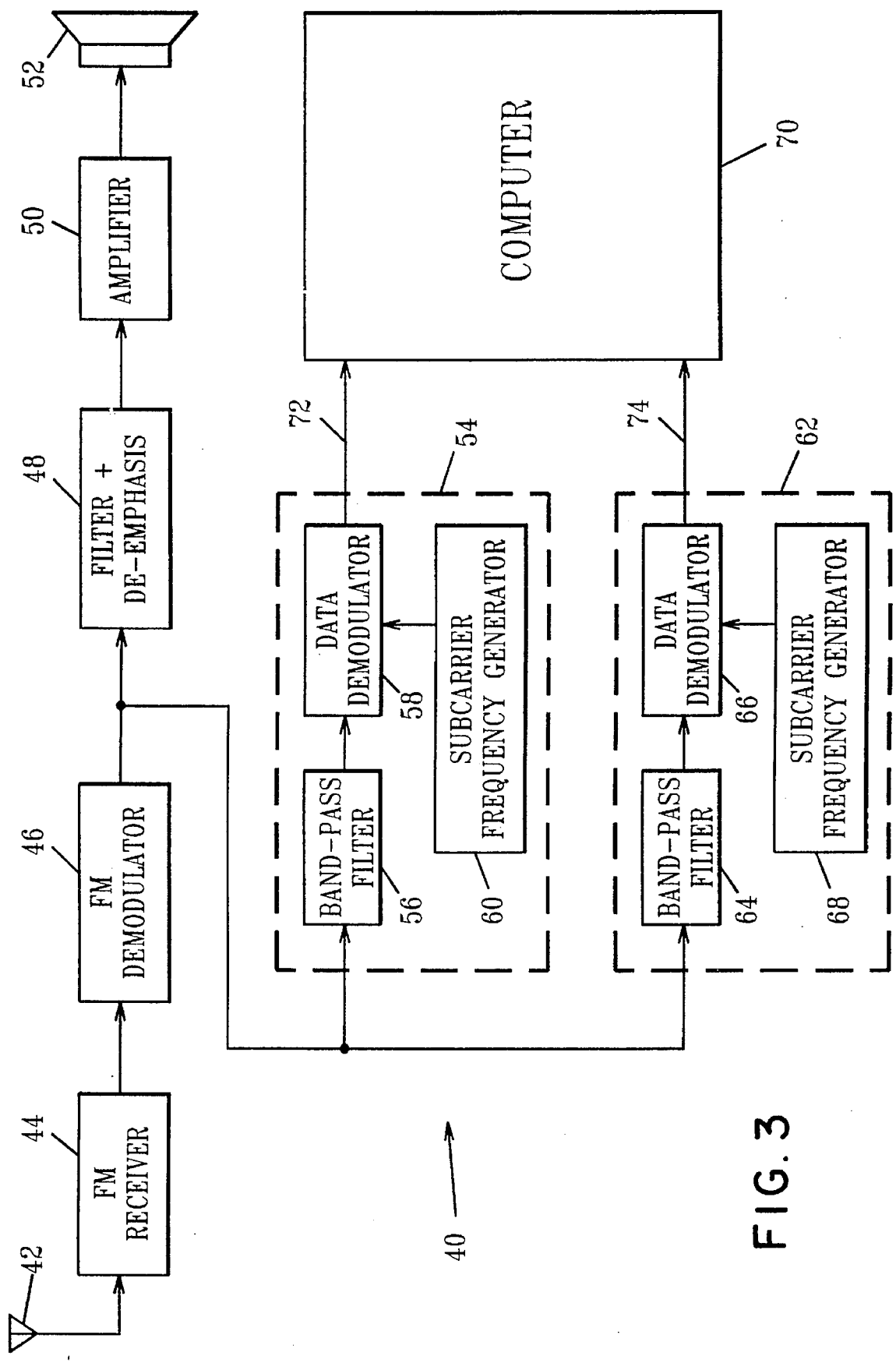

RADIO INFORMATION BROADCASTING AND RECEIVING SYSTEM

BACKGROUND OF THE INVENTION

1. Field of the Invention

The present invention relates generally to radio broadcasting and receiving systems, and more particularly to radio broadcasting and receiving systems wherein both frequency modulated audio and textual information are transmitted and demodulated at a receiver. The textual information is stored and processed by a computer.

2. Background Art

The radio signal transmitted from a FM station is an electromagnetic wave which frequency shifts according to the amplitude of the audio signals. The center frequency is the carrier frequency which is in the band of 88–108 Mhz for commercial FM stations in the USA. Each station has a bandwidth of 200 kHz and the audio frequency response is between 50 to 15000 Hz. According to the FCC regulations Part 73, Subpart B, subcarriers which carry other information are allowed to multiplexed with the main program. The subcarriers and their significant sidebands must be within the range of 20 to 99 Khz when monophonic program is broadcasting and 53 to 99 Khz for stereophonic program. This subcarrier multiplexing has been utilized for background music for restaurants and multilingual broadcasting. Subcarrier multiplexing has also been proposed for nationwide paging services, differential global positioning systems, and Radio Broadcasting Data Systems (RBDS or RDS) in which the station name and music format are transmitted as textual messages along with the main program.

References relating to the field of data communication are as follows:

U.S. Pat. No. 4,928,177 issued May 22, 1990 to Martinez entitled TWO-WAY DATA BROADCAST NETWORKS discloses a communication system wherein forward link communication is achieved utilizing a conventional television broadcast station, either utilizing an entire presently unused TV channel or in a shared TV mode, with the return link communication being achieved using narrow band communication techniques for relatively low data rate communication through conventional television receiver aerials to a central receiver near the television station transmitter. The carrier reference of a local AM radio station is used as a synchronizing reference for the data streams and to allow the very close separation of each band in the return communication link to allow a large number of remote receivers to simultaneously communicate in the reverse link. Alternatively, the TV Chroma subcarrier serves this purpose.

U.S. Pat. No. 4,512,025 issued Apr. 16, 1985 to Frankel et al. entitled INCREASING CAPACITY OF BASEBAND DIGITAL DATA COMMUNICATION NETWORKS discloses broadband network capabilities for baseband digital collision detection transceiver equipment for communication between a plurality of data stations by affording simultaneous transmission of multiple channels over a broadband pass transmission link such as coaxial cable. Thus, a fundamental carrier wave is transmitted on the link, received at local data stations and used to detect signals on different baseband channels for reception. For transmission the carrier wave typically is used for segregating a plurality of at least two transmission channels into typically single sideband upper and lower pass bands of baseband bandwidth capability adequately separated with guard bands to permit simple separation for receiving by means of pass band filters, etc.

U.S. Pat. No. 4,280,020 issued Jul. 21, 1981 to Schnurr entitled RADIO TELEPHONE SYSTEM WITH DIRECT DIGITAL CARRIER MODULATION FOR DATA TRANSMISSION discloses a radio-telephone system which transmits data and speech on separate sideband channels. The data and the speech signals are separated in the frequency domain, and are transmitted in respective separate sideband channels. The data sideband channel contains sidebands generated by time coding an otherwise continuous wave signal. The latter signal may be a carrier signal which is modulated to convey the speech signals.

U.S. Pat. No. 3,986,122 issued Oct. 12, 1076 to McManus entitled RELIABLE COMMUNICATIONS SYSTEM discloses a communication transmitter system having an upper and lower sideband containing a digital word which can be complemented to indicate information content having serial register means adapted to receive digital information for generating a digital word and having inputs and outputs; parallel register means operatively connected to the output of said serial register means for storing the output of said serial register; modulating means operatively connected to the output of said parallel register means for generating upper and a lower sidebands; each of said sidebands containing said digital word complementing means operatively connected to said modulating means for complementing one of said upper and lower sidebands; and radio frequency transmitter means operatively connected to the output of said complementing means and said modulating means for transmitting said upper sideband and lower sideband simultaneously.

U.S. Pat. No. 3,967,202 issued Jun. 29, 1976 to Batz entitled DATA TRANSMISSION SYSTEM INCLUDING AN RF TRANSPONDER FOR GENERATING A BROAD SPECTRUM OF INTELLIGENCE BEARING SIDEBANDS discloses a data transmission system which uses multiple sidebands for separate data transmission and includes an interrogate source for transmitting RF interrogate signals to the locations of the data sources and a transponder associated with each data source for receiving the interrogate signals and for generating FR reply signals representing the information. The transponder includes a transmitter having a voltage controlled oscillator responsive to data signals at first and second levels to generate sinusoidal output signals at first and second frequencies, respectively, a wave shaping circuit which converts the output signals to sawtooth wave signals at the corresponding frequencies and an FM oscillator for providing a carrier signal which is modulated by the sawtooth signals to produce a broad spectrum of sideband signals of approximately equal amplitude.

SUMMARY OF THE INVENTION

An object of the present invention is to provide an FM radio broadcasting system using multi-subcarriers containing audio and textual information.

Another object of the present invention is to provide an FM radio broadcasting system using multiple subcarriers wherein at least one of the subcarriers is used to transmitting an index or outline of the information on the other subcarriers.

Still another object of the present invention is to provide an FM radio broadcasting system wherein digital data is received by a radio receiver and is stored and processed on a computer.

BRIEF DESCRIPTION OF THE DRAWINGS

The above set forth and other features of the invention are made more apparent in the ensuing Detailed Description of the Invention when read in conjunction with the attached drawings, wherein:

FIG. 1 is an illustration of the relationship of the main program frequency and the sub carrier frequencies in the frequency domain in the baseband at one embodiment of the present invention.

FIG. 2 is a schematic block diagram of an embodiment of an FM radio transmitter for communication system according to the principles of the present invention.

FIG. 3 is a schematic block diagram of an FM radio receiver for a communication system according to the principles of the present invention.

DESCRIPTION OF A PREFERRED EMBODIMENT

Certain types of information such as news, advertisements, tourist attractions, etc., are particularly suited for broadcasting through radio channels. Currently, the information transmitted from radio stations is in audio format which is good for listening but is difficult to convert to hard copies especially if it is a speech. The speech signal could be recorded on tapes and then converted to a transcript later. However, this conversion process is tedious. Furthermore, the information in the current format is difficult to be re-processed by computers such as string search and word processing. The present invention system solves this problem by providing a system wherein the broadcasting information is transmitted as the main program from a FM station while the transcript of the information in electronic data format is multiplexed with the main program using subcarriers. A receiver then receives the data from the subcarriers and the data are sent to a computer for further processing.

Referring to FIG. 1 an illustration is shown where the frequency spectrum of the baseband signals of the typical embodiment of the present invention. The audio signal of the main program of an FM radio broadcast system usually spans anywhere from near 20 to 20,000 Hz for monophonic program and from near 20 to 53,000 Hz for stereophonic sound program. The frequencies of subcarriers to be mixed with these main audio signals can be anywhere between 20,000 to 99,000 Hz for monophonic and 53,000 to 99,000 Hz for stereophonic programs. FIG. 1 shows a main program frequency of 15 Khz and three subcarriers identified as 1, 2, and n of 67 Khz, and 78 Khz and 99 Khz. The number and frequency of subcarriers to be used in the invention are not limited to the ones shown in FIG. 1. In the invention at least two subcarriers, for example 1 and 2 are used. On subcarrier 2 continuous data is broadcasted and on subcarrier 1 an index of what is on subcarrier 2 is broadcasted. A user uses a computer equipped with a proper receiver to receive signals on these two subcarriers. A program running on the computer will then display the index on the computer screen while storing the main information bits on subcarrier 2 in the computer memory or storage. The user can then read the index first and react to the index according to the user's will. For example, the user can select parts of a newspaper text or picture which is broadcasted on subcarrier 2 by selecting the parts based on the index on the subcarrier 1.

Thus, an FM signal is transmitted containing main program audio signals and subcarrier signals containing first and second digital data. As an example, the main program audio signal may be a speech or lecture, and the subcarrier signals may contain the digitized text of the speech or lecture as well as an index to the text. In another example, the main program can be used for music, the first subcarrier may contain travel information such as the hotels in a given city, and the second subcarrier may be an index to the hotels of the first subcarrier by price range or location.

The radio information broadcasting and receiving system of the present invention consist of three major parts: an FM transmitter station with subcarrier multiplexing capability, an FM receiver apparatus with subcarrier demodulation capability, and a computer connected in combination with the receiver apparatus.

Referring to FIG. 2, the FM transmitter station 10 is shown including sources of main programming signals 12, first digital data signals 14 and second digital data signals 16. The first and second digital data signals from sources 14 and 16 are modulated by subcarrier 1 and subcarrier 2 frequencies respectively and the modulated signals are applied to an analog signal mixer 20 where they are mixed with the main program signal and FM modulated by modulator 34 and then transmitted via FM transmitter 36 and antenna 38.

Referring to FIG. 3, a receiver apparatus 40 is shown including an antenna 42, an FM receiver circuit 44, and an FM demodulator circuit 46 for receiving the broadcast signal and demodulating it. The demodulated main program audio frequency signal is applied through a filter/de-emphasis circuit 48 and amplifier 50 to speaker 52 to provide an audio output.

The output signal from FM demodulator 46 is also applied to a demodulator means 54 including first band-pass filter circuit 56 that passes the first subcarrier sideband frequency signal on to data demodulator circuit 58. The first subcarrier sideband frequency signal is demodulated by first subcarrier frequency generator 60 to provide a digital signal of the text portion of the transmitted signal which is then applied to a first input port 72 of digital computer 70.

Likewise, the output signal from FM demodulator 46 is also applied to demodulator means 62 including a second band-pass filter circuit 64 to pass the second subcarrier sideband frequency signal on to data demodulator circuit 66 where the resultant digital data signal is applied to computer 70 on input port 74.

Referring more particularly to FIG. 2, the transmitter station 10 is illustrated having three input signal sources 12, 14 and 16. The main program audio input signals are applied from source 12 to a conventional pre-emphasis circuit 18 and then to an analog signal mixing circuit 20.

A first digital data signal, for example digitized newspaper text or photographs, is applied from source 14 to a data modulator 22 in a subcarrier 1 block where it is modulated with a first subcarrier frequency (such as frequency 1, 2 etc. of FIG. 1) by a subcarrier frequency generator 24. The modulated digital output signal from data modulator 22 is passed through filter circuit 26 to analog signal mixer 20. The data modulation techniques that can be employed include but are not limited to frequency shift keying, phase shift keying and amplitude and phase modulation.

A second digital data signal, for example a digitized index of the data that is contained in the first digital data signal from source 14, is applied from source 16 to data modulator 28 in subcarrier block 2 where it is modulated with a second subcarrier frequency (such as a second one of frequencies 1, 2 etc.) by a subcarrier frequency generator 30. The modulated digital output signal from data modulator 28 is passed through filter circuit 32 to analog signal mixer 20.

The output signal from analog signal modulator 20 is applied to FM modulator circuit where it is modulated around a carrier signal and then radio broadcast by means of FM transmitter circuit 36 and antenna 38. The transmitted radio broadcast signal is received by antenna 42 and FM receiver 44 in the receiver apparatus 40 of FIG. 3. The received signal is FM demodulated in demodulator 46. The main program audio signal is passed through filter and de-emphasis circuit 48 and amplifier 50 after which it is sent through speaker 52.

The first subcarrier frequency signal is applied to demodulator means 54 where it is passed through first band-pass filter 54 and then the first digital data is obtained by data demodulator circuit 58 and the first subcarrier frequency generator 60. The digital data signal from data demodulator 58 is then applied to a first input port 72 of computer 70.

The second subcarrier frequency signal is applied through band-pass filter 64 demodulated by data demodulator circuit 66 and second subcarrier frequency generator 68 to provide a digital data signal of the index of the first subcarrier sideband information. The digital index signal from data demodulator circuit 66 is applied to a second input port 74 of digital computer 70.

The program of the computer 70 stores the raw data bits from the first and second subcarriers into memory or a storage. The data bits are grouped in blocks and each block of data consists of its identification number, real data, information bits on forward error detection and correction of the real data, and other control bits. The program will perform the error detection and correction on each block of data received. If the errors on the real data can be corrected, the program will go ahead and correct and put them into memory or storage. If the errors are not amenable, the whole block will be marked accordingly. The program will then check the identification number of the block with other blocks already in the memory. If more than one block with the same ID number are present, the program will do a comparison between blocks. A decision will be made to keep the block with the least errors found. For example, if there are three blocks with the same ID number, the two blocks that have the same bit pattern will be kept. Since the data is sent continuously and repeatedly, the errors in the received data becomes less and less as time passes by. Furthermore, the index is sent on one subcarrier and hence it can be repeated more often because it is generally much shorter than the main text. The idea to have the index information on one subcarrier is to give the user an outline of the complete text earlier and with less errors. The user can act on the index before the complete text being received. For still another example, in the tourist information example, one subcarrier has a list of the names of hotel and another contains a list of the names of restaurants. The details of each hotel and restaurant will be on two subcarriers separately. A total of three subcarriers will be used. At the beginning, a menu will be shown on the computer screen with two selections—hotel and restaurant and a user, say, selects hotel. The program will then show the names of hotels on the screen. When the user selects Hotel A, the program will see if the detailed information of Hotel A has arrived. If so, it will display it. Otherwise, it will display "Information not received yet, please try later". Other than waiting, the user can now select restaurants and see what choices he can have. The user can do that right a way because the detailed information of restaurants are sent on another subcarrier and some parts of the information should be received already.

While a preferred embodiment of the invention has been disclosed in detail, it should be understood by those skilled in the art that various other modifications may be made to the illustrated embodiment without departing from the scope of the invention as described in the specification and defined in the appended claims.

We claim:

1. A radio information broadcasting system comprising:

a broadcast transmitter means including a source of main program audio input signals at a carrier frequency, at least first and second sources of digital data input signal, a first subcarrier means connected to a first one of said at least first and second sources of digital data input signals for providing a digitally modulated signal at a first subcarrier frequency and at least a second subcarrier means connected to a second one of said at least first and second sources of digital data input signals for providing a digitally modulated signal at a second subcarrier frequency, wherein said first digital data input signals consists of text encoded into a relatively long string of digital signals representative of a plurality of separate subject indices and said at least second digital data input signals consists of index data related to the separate subject indices of said text data of said first digital data signals, said index data being encoded into a relatively long string of digital data signals, an analog signal mixer means connected to said source of main program audio input signals, and to said first and to said at least second digitally modulated signals at said first and at least second subcarrier frequency to provide a combined main program carrier signal and at least two subcarrier frequency signals on a baseband, means for frequency modulating said combined signals from said analog signal mixer and means for repeatedly transmitting said frequency modulated combined signal for a given period of time, said radio information broadcasting system further including a receiving means including frequency modulation receiver and demodulating circuits for receiving said repeatedly transmitted frequency modulated combined signal from said broadcast transmitter means and demodulating said received repeatedly transmitted frequency modulated combined signal into a main program frequency signal, and at least first and second subcarrier frequency signals, filter means responsive to the outputs of said demodulating circuits for separating the frequency bands of said first and second subcarrier frequency signals from said main program audio signal, an audio output circuit having a speaker connected to said demodulated main program signal, subcarrier frequency generating means for generating first and second subcarrier frequencies and data demodulation means connected to said subcarrier frequency generating means and responsive to said separated frequency bands of at least first and second subcarrier frequency signals for demodulating the data thereon to provide at least first and second digital data signals transmitted by said broadcast transmitter, said receiving means further including, a digital data processing computer means response to said data demodulator means including a storage memory responsive to said first and second digital data signals therefrom for storing said first and second digital data signals from said data demodulator means in said memory and for performing first and second levels of error correction on said stored first and second digital data signals wherein said first level of error correction is bit error correction and said second level of correction and wherein said second level of error correction selects the one of the repeatedly transmitted combined signal with the least errors.

2. A radio information broadcasting system according to claim 1 wherein said first subcarrier means of said broadcast transmitter includes a first data modulator circuit connected to said first source of digital data input signals, a first subcarrier frequency generator connected to said first data modulator circuit for modulating said text encoded first digital data signals with a first subcarrier frequency signal, and means connecting said modulated first digital data signals to said analog signal mixer means and wherein said second subcarrier means of said broadcast transmitter includes a second data modulator circuit connected to said second source of index encoded-digital data input signal, a second subcarrier frequency generator connected to said second data modulator circuit for modulating said second digital data signals with a second subcarrier frequency signal, and means for connected said modulated second digital data signals to said analog signal mixer means.

3. A radio information broadcasting system according to claim 2 wherein said receiving means includes a first demodulating means including a first band-pass filter circuit connected to said first one of said transmitted digital data signals, a first data demodulator circuit connected to the output of said first band-pass filter circuit, and a first subcarrier frequency generator circuit connected to said first data demodulator circuit for demodulating said first one of said transmitted digital data signals onto a first output lead, and a second demodulating means including a second band-pass filter circuit connected to said second one of said transmitted digital data signals, a second data demodulator circuit connected to the output of said second band-pass filter circuit, and a second subcarrier frequency generator circuit connected to said second data demodulator circuit for demodulating said second one of said transmitted digital data signals onto a second output lead.

4. A radio information broadcasting system according to claim 3 further including a digital data processing computer means including a storage memory connected to said first and second output leads of said receiving means for storing said demodulated first and second digital data signals in said memory, and further including a display means for displaying said text of said first digital data signals.

5. A radio information broadcasting system according to claim 4 wherein said text data displayed on said display means of said digital data computer means is selected in accordance with said index data.

6. A radio information broadcasting system according to claim 4 wherein said index encoded second digital data signals are transmitted repeatedly for each transmission of said text encoded first digital data signals.

7. A radio information broadcasting system according to claim 4 wherein said first and second digital data signals include data bits for identification numbers, control bits and error detection bits, and wherein said digital data processing computers means performs error detection on said first and second digital data signals.

* * * * *